United States Patent
Rooke et al.

(10) Patent No.: US 6,798,152 B2
(45) Date of Patent: Sep. 28, 2004

(54) CLOSED LOOP CURRENT CONTROL CIRCUIT AND METHOD THEREOF

(75) Inventors: Alan Michael Rooke, Northville, MI (US); Ibrahim S. Kandah, Canton, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/224,817

(22) Filed: Aug. 21, 2002

(65) Prior Publication Data

US 2004/0036418 A1 Feb. 26, 2004

(51) Int. Cl.[7] ............................................. H05B 37/02
(52) U.S. Cl. ...................... 315/209 R; 315/307; 315/216
(58) Field of Search .................... 315/209 R, 210, 315/211, 216, 291, 300, 307, 224, 311, 247, 308; 345/82; 363/21.01, 89; 340/815.45; H05B 37/02

(56) References Cited

U.S. PATENT DOCUMENTS

| | | | | |
|---|---|---|---|---|
| 3,944,854 A | | 3/1976 | Keller | 307/311 |
| 5,781,045 A | | 7/1998 | Walia et al. | 327/108 |
| 6,091,614 A | * | 7/2000 | Malenfant | 363/97 |
| 6,118,259 A | | 9/2000 | Bucks et al. | 323/312 |
| 6,161,910 A | * | 12/2000 | Reisenauer et al. | 315/309 |
| 6,198,405 B1 | | 3/2001 | Andersson et al. | |
| 6,285,139 B1 | * | 9/2001 | Ghanem | 315/291 |
| 6,362,578 B1 | * | 3/2002 | Swanson et al. | 315/307 |
| 6,515,434 B1 | * | 2/2003 | Biebl | 315/291 |
| 2002/0140379 A1 | * | 10/2002 | Chevalier et al. | 315/291 |
| 2003/0075997 A1 | * | 4/2003 | Keim et al. | 310/68 D |

FOREIGN PATENT DOCUMENTS

EP 0 342 814 A2 11/1989

* cited by examiner

Primary Examiner—Don Wong
Assistant Examiner—Trinh Vo Dinh
(74) Attorney, Agent, or Firm—Toler, Larson & Abel, LLP

(57) ABSTRACT

A circuit and method for providing closed loop control using constant current switching techniques is disclosed herein. By controlling the current supplied to high intensity light emitting diodes (LEDs) using the techniques and circuits described, high intensity LEDs can be operated at or near their maximum capacity without danger of overloading the LEDs, and without using excess amounts of current. A circuit as described herein, has multiple high side switches, each of which is connected to an LED array. The LED arrays are in turn connected through an inductor to a current switching control section that switches current to ground, or recirculates the current to maintain LED current flow within a desired range.

53 Claims, 5 Drawing Sheets

CLOSED LOOP CURRENT CONTROL CIRCUIT AND METHOD THEREOF

FIELD OF THE DISCLOSURE

The present disclosure relates generally to control circuits, and more particularly to closed loop current control circuits.

BACKGROUND

Light emitting diodes (LEDs) are current driven devices, meaning that the amount of current passing through an LED controls its brightness. In applications such as automotive lamps, high intensity LED's can be used in place of more conventional light sources such as light bulbs. However, the LED's and their control circuits must be closely matched to avoid brightness variation between adjacent lights. This same problem arises in other applications that employ high intensity LED's or LED arrays, for example traffic signals and the like.

Manufacturers have implemented several solutions to address the need to closely control the amount of current flowing through the LEDs. One solution is to keep a constant current flowing through the LEDs by using a linear constant current circuit. One problem with using a linear constant current circuit, however, is that the control circuit dissipates a large amount of power, and consequently requires large power devices and heat sinks.

A more power efficient solution has been tried which uses a buck-boost regulator to generate a regulated common voltage supply for the high side of the. LED arrays. Low side ballast resistors are then used to set the LED current, and separate resistors are used to monitor the current. This voltage controlled system also requires compensation diodes to allow for temperature changes in LED characteristics, and requires selecting the current ballast resistors to match the current versus brightness characteristics. Unfortunately the current versus brightness characteristics can change with each batch of LEDs and thus component matching becomes a major consideration. Although this method is more power efficient than using a linear constant current circuit, it still requires large power dissipating external components because current is controlled indirectly through voltage. Another known method for controlling the current through an LED array can be found in U.S. Pat. No. 6,198,405, which uses simple inductor buck-boost type circuits to provide open loop current control with peak currents being much higher than the average LED current since current flow through the LEDs is not continuous. This method, however, does not allow operation of high intensity LEDs at full brightness because of the current swings required.

What is needed therefore is a way to control the current through high intensity LEDs which is both efficient and allows operation of the high intensity LEDs at full brightness.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

FIGS. 1–5 illustrate a circuit and method for providing direct closed loop control of current passing through a current sensitive load, such as one or more LED arrays. By employing closed loop current control, more accurate current control and lower power dissipation can be achieved as compared to more conventional methods of controlling LED current. Additionally, at least one of the circuits discussed in relation to FIGS. 1–5 include programmable logic to lessen the need for exact component matching. Various circuits described herein also require fewer external components, as compared to currently available circuits, thereby providing for lower implementation costs. By combining the current flowing through a number of LED arrays, passing that combined current through an inductor, and monitoring the combined current, the desired average current flow through the LED arrays can be accurately controlled, while large swings in the amount of current passing through the LEDs are avoided.

High intensity LEDs are usually operated near their maximum current rating to achieve optimum brightness. Since exceeding the LEDs' maximum current rating can cause the LEDs to malfunction, limiting the maximum amount of current passing through the LEDs so that the maximum current is not significantly greater than the average current can be important. By limiting the peak currents passing through the LEDs, the LEDs can be operated closer to their maximum current rating than would otherwise be possible. In addition, by using a constant current switching technique instead of a linear constant current circuit, power requirements of the control circuit may be reduced.

The circuits and methods illustrated in FIGS. 1–5 can be used in a variety of applications. For example, automotive tail lamp assemblies and traffic control signals may employ the teachings set forth herein. When the control circuit is used in an automotive tail lamp application, the circuit may be implemented in a power Bi-CMOS integrated circuit which can then be packaged with an inductor in an automotive tail lamp. However, the use of the various circuits and methods described herein is not limited to automotive tail lamp applications, but can be used in any application which might benefit from closed loop current as described herein.

Figure 1:
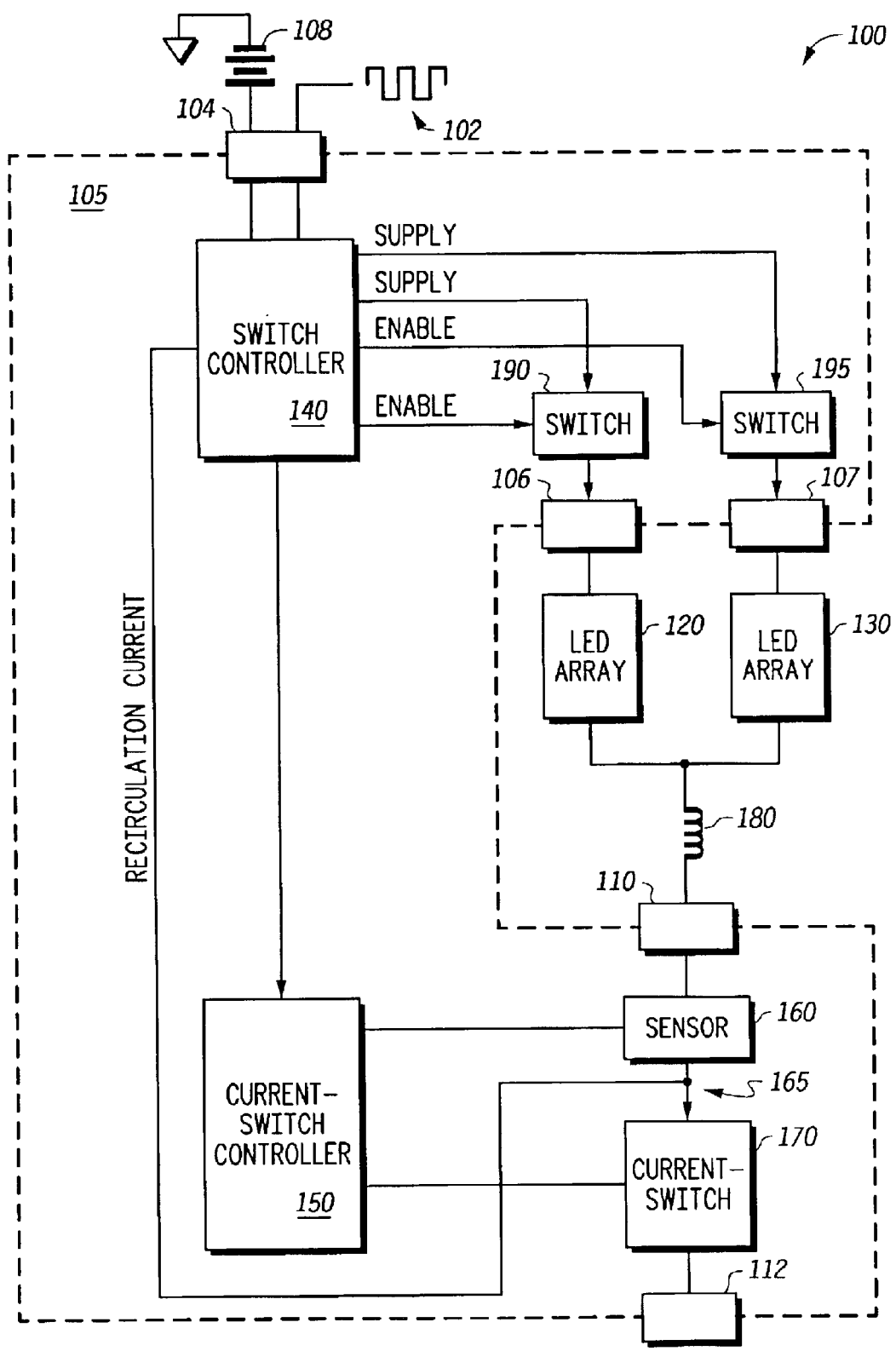
FIG. 1 is a block diagram of a circuit used to control LED arrays according to an embodiment of the present disclosure.

Referring first to FIG. 1 a block diagram illustrating a direct closed loop current control circuit using a constant current switching technique to control the amount of current flowing through LED arrays is illustrated, and designated generally Circuit 100. Circuit 100 includes integrated circuit IC 105, LED arrays 120 and 130, inductor 180, battery 108 and control line 102. LED array 120 is connected to port 106 of IC 105, LED array 130 is connected to port 107 of IC 105, and inductor 180 is connected in series between LED arrays 120, 130 and port 110 of IC 105. Battery 108 and control line 102 are connected to IC 105 through port 104.

IC 105 includes switch controller 140, high side switches 190 and 195, current switch controller 150, sensor 160, and current switch 170. Switch controller 140 is connected to battery 108 and control line 102 through port 104. In addition, controller 140 has a supply line and an enable line connected to each of switches 190 and 195, which are connected in turn to ports 106 and 107, respectively. Additionally, switch controller 140 is connected to current switch 150, and to current node 165. Current switch controller 150 is connected to switch controller 140, sensor 160, and current switch 170. Sensor 160, current node 165, and current switch 170 are further connected in series with each other between port 110 and port 112.

In the illustrated embodiment, switch controller 140, switches 190 and 195, current switch controller 150, sensor 160 and current switch 170 are formed in a power Bi-CMOS integrated circuit (IC) such as IC 105, while LED array 120, 130 and inductor 180 are external to IC 105. Such an arrangement may be advantageous when Circuit 100 is used in a tail lamp assembly for an automobile, or another application in which it may be desirable to replace IC 105 without replacing LED arrays 120 and 130. In other embodiments, however, all of the illustrated components of Circuit 100, including LED arrays 120, 130, inductor 180 and IC 105, may be included in a single package. Additionally, various components illustrated as part of IC 105 may be implemented as separate components, any combination of which may be packaged individually or together.

Battery 108 has two sides: a supply side, and a return side, and provides power for Circuit 100. However, multiple supplies may be used in place of a single battery 108. In the illustrated embodiment, power comes in port 104 and is routed through switch controller 140, over the supply lines, to switches 190 and 195. The routing may be actively controlled using logic (not shown) in switch controller 140, or may be passive. In at least one embodiment, the power necessary to operate IC 105 is also provided by battery 108. Port 104 may also be connected to control line 102 for receiving either analog or digital control signals indicating to switch controller 140 which of the switches 190 and 195 is to be activated via the enable lines, as well as the amount of current that should be supplied through each particular switch to LED arrays 120 and 130. Control information from control line 102 may be further provided to current switch controller 150, thereby allowing current switch controller 150 to be programmed for proper control of current switch 170, which acts as a current limiter.

When switches 190 and 195 are activated, current switch controller 150 activates current switch 170 to allow current to flow through LED arrays 120 and 130. In at least one embodiment switches 190 and 195 are current limited to equalize the amount of current flowing through each LED array when both LED arrays are illuminated. When current switch 170 is activated, the combined current from LED arrays 120 and 130 is passed through inductor 180, through sensor 160, through current switch 170, and on to ground. However, when current switch 170 is deactivated, the combined current from inductor 180 flows through current sensor 160 and is recirculated through node 165, then back to switch controller 140 and switches 190, 195. Current switch controller 150 proceeds to activate and deactivate current switch 170 as needed to limit/maintain combined current flow through LED arrays 120 and 130, as indicated by sensor 160, within a desired range.

To better understand the operation of Circuit 100, consider the following examples. First consider the situation in which only a single LED array, for example LED array 120, is to be activated. This situation might arise in an automotive application where LED array 120 is used as a brake light to be illuminated when the brake pedal is pressed, and LED array 130 is used as a tail light that is to be illuminated whenever the headlights of the automobile are turned on. In the illustrated embodiment, when the driver of the automobile turns his headlights on, the voltage from battery 108 is connected through port 104 to switch controller 140, and a control signal is supplied to switch controller 140 over control line 102. Switch controller 140 performs two functions. First, switch controller 140 sets the total amount of current through LED arrays 120 and 130. Second, switch controller 140 controls switches 190 and 195.

To allow current to flow through LED array 130 as in the present example, switch controller 140 activates switch 195 but not switch 190. By activating only switch 195, current from battery 108 is allowed to flow through switch 195 into LED array 130, but not into LED array 120. The current flowing into LED array 130 then flows to a voltage reference, such as ground, after passing through inductor 180, sensor 160 and current switch 170.

Switch controller 140 sets the total amount of current to be used by programming current switch controller 150 based on the number of LED arrays to be activated. In the present example, switch controller 140 programs current switch controller to provide the proper amount of current for use by a single LED array. By knowing that a single LED array is to be activated current switch controller 150 can properly interpret the input from sensor 160 to control the amount of current flowing through inductor 180. When current switch controller 150 is notified that LED array 130 will be activated, current switch controller 150 activates current switch 170 so that current will pass through current switch 170 to ground rather then being routed back through LED array 130. Sensor 160 measures the amount of current flowing out of inductor 180, and sends this information to current switch controller 150. If the amount of current flowing through inductor 180 is outside of a desired range, then current switch controller 150 will change the state of current switch 170 so that current is recirculated rather then going to ground. In effect, switch controller 140, current switch controller 150, sensor 160, and current switch 170 act as a current-limiter circuit.

In this example, assume that LED array 130 is to be operated at 500 mA. As long as the current flowing through LED array 130 and into inductor 180 is between 500 mA and some upper limit, for example 550 mA, then current switch controller 150 leaves current switch 170 activated. However, if the current flowing through LED array 130 and inductor 180 exceeds 550 mA, current switch controller 150 will deactivate switch 170 so that current no longer flows through port 112 to ground, but instead recirculates through LED array 130. By providing closed loop current control in this manner, large current swings can be avoided.

When current switch 170 is deactivated, current flowing through inductor 180 will bypass current switch 170 and recirculate to switch controller 140, which in one embodiment includes one or more diodes or synchronous switches (not illustrated) to connect the recirculation current to the supply lines connected to switches 190 and 195. The voltage across inductor 180 will spike, and then gradually decrease. As the voltage across inductor 180 drops, causing the recirculation current to linearly decrease, the current flowing through LED array 130 and inductor 180 will begin to decrease. Once the current flowing through LED array 130 decreases below a predetermined value, for example 450 mA, current switch controller 150 will reactivate current switch 170. When current switch 170 is reactivated, recirculation current no longer flows; instead the current flowing through inductor 180 passes to ground through current switch 170, allowing total current to increase. Note that suitable variants of switch 170 may be employed, such that current is directed to ground when switch 170 is de-activated, and re-circulated when switch 170 is activated.

As will be appreciated, by activating and deactivating current switch 170 as needed to maintain current flowing through inductor 180 within a desired range, the current flowing through LED arrays 120 and 130 may be closely controlled without exceeding a maximum rated value of the LEDs. In at least one embodiment, the desired range is +/−5 percent of the nominal operating current of all activated LEDs. In other embodiments, the range is extended to +/−10 percent, and in others +/−20 percent. Since it is generally desirable to operate high intensity LEDs close to their peak current ratings, in many cases smaller ranges of current variation are desirable.

Consider now the case where LED array 130 is already on, and LED array 120 is activated when the user pushes the brake pedal. In this example, both LED array 120 and 130 are to be turned on. If each LED array operates using a nominal 500 mA of current, then 1000 mA of current should be flowing through inductor 180. Switch controller 140 notifies current switch controller 150 that both LED arrays 120 and 130 are to be activated, so current switch controller 150 knows that instead of turning current switch 170 on or off when the current through inductor 180 falls outside of some range centered around 500 mA, current switch controller 150 activates or deactivates current switch 170 falls outside of a range centered around 1000 mA.

Assuming LED arrays 120 and 130 are balanced, 500 mA of current will flow through both LED array 120 and LED array of 130. The two 500 mA branch currents will then be combined so that 1000 mA of current flows through inductor 180. If the amount of current sensed by sensor 160 increases above some predetermined threshold, then current switch 170 is turned off to force recirculation current to flow back to switches 190 and 195 rather than allowing current to flow to ground. As the amount of current flowing through inductor 180 decreases below a threshold value, current switch controller 150 will reactivate current switch 170, thereby allowing more current to flow from battery 108 through LED arrays 120 and 130, and on to ground through port 112.

It will be appreciated, however, that if LED arrays 120 and 130 are not evenly balanced, then although current switch controller 150 maintains the total amount of current at approximately 1000 mA, there is no guarantee as to how much current is flowing through which LED array 120 or 130. For example 300 mA of current may be flowing through LED array 120 and 700 mA of current may be flowing through LED array 130. In this case it becomes advantageous to current limit switches 190 and 195, such that the maximum amount of current flowing through any one particular array does not exceed the peak current rating of that array. So, for example, if LED array 130 is attempting to draw 700 mA of current while LED array 120 is only drawing 300 mA of current, then although the total current passing through inductor 180 is optimum, the LEDs in LED array 130 may be damaged by excessive current flow. However by current limiting switches 195 and 190 to a maximum current flow of, for example 600 mA, the LED arrays 120 and 130 can be protected from large current spikes regardless of any mismatch between LED arrays 120 and 130.

In at least one embodiment, the maximum amount of current which switches 190 and 195 may pass is adjustable, or programmable. This may be accomplished by employing extra logic in switch controller 140 to activate/deactivate various current "bypass" branches (not illustrated), by providing programmable variable resistances (not illustrated), or by other methods of current limiting known to those skilled in the art. Having discussed generally closed loop current control according to one embodiment of the present disclosure, a more detailed explanation will be set forth in the following paragraphs.

Figure 2:
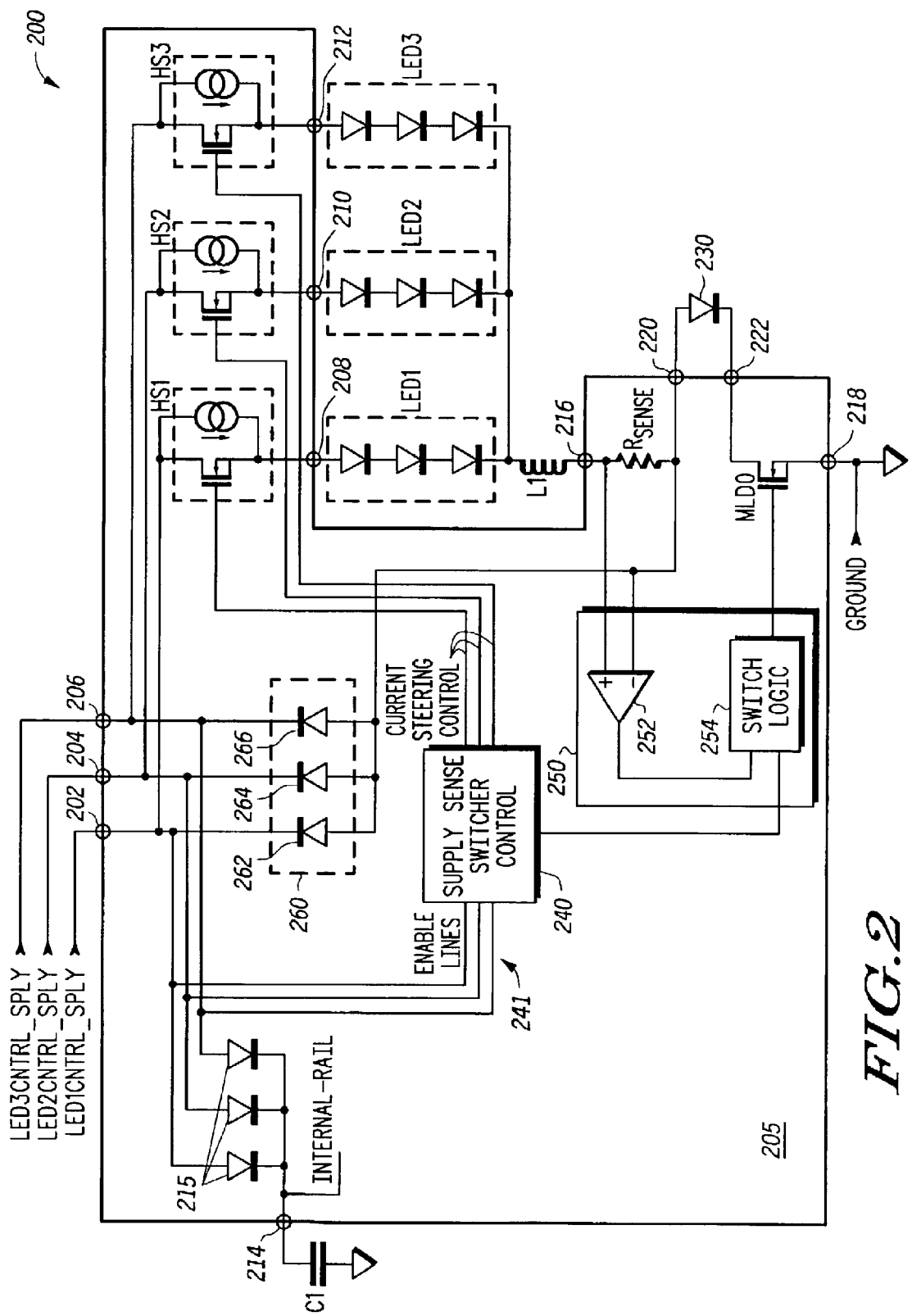
FIG. 2 is a combined block and schematic diagram of a controller employing a constant current switching technique to control current through LED arrays according to an embodiment of the present disclosure.

Referring next to FIG. 2, a schematic diagram of a circuit according to one embodiment of the present disclosure will be discussed. LED circuit 200 includes integrated circuit IC 205, LED arrays LED1, LED2 and LED3, inductor L1, and control/supply lines LED3CNTRL_SPLY, LED2CNTRL_SPLY and LED1CNTRL_SPLY. LED arrays LED1, LED2 and LED3 are connected to outputs 208, 210, and 212, respectively. Inductor L1 is connected in series between LED1, LED2, LED3 and inductor input 216. LED circuit 200 also includes capacitor C1 connected to internal rail port 214; and reverse battery-protection diode 230 connected between reverse battery ports 220 and 222.

IC 205 includes high side switches HS1, HS2 and HS3, sense resistor Rsense, low side switch MLD0, controller 250, supply sense switcher control 240, recirculator 260, and internal rail diodes 215. Supply sense switcher control 240 is connected to control/supply lines LED3CNTRL_SPLY, LED2CNTRL_SPLY and LED1CNTRL_SPLY via outputs 202, 204, and 206. Supply sense switcher control 240 is also connected to controller 250 and to the control nodes of high side switches HS1, HS2 and HS3. High side switches HS1, HS2 and HS3 also each have a first current node connected to LED3CNTRL_SPLY, LED2CNTRL_SPLY and LED1CNTRL_SPLY via inputs 202, 204, and 206; and a second current node connected to LED arrays LED1, LED2 and LED3 through outputs 208, 210, and 212.

In addition to a control input connected to supply sense switcher control 240, controller 250 has two sense inputs connected across Rsense, and a control output connected to the control node of low side switch MLD0. Controller 250 further includes differential amplifier 252 connected to Rsense via the two sense inputs, and logic 254 connected to the control input and the control output.

Rsense is connected in series between reverse battery port and inductor input 216. Low side switch MLD0 has a first current electrode coupled to reverse battery port 222, and a second current electrode coupled to ground output 218.

Recirculator 260 is coupled between the low side of Rsense and LED3CNTRL_SPLY, LED2CNTRL_SPLY and LED1CNTRL_SPLY via outputs 202, 204, and 206. Recirculator 260 includes recirculation diodes 262, 264 and 266.

In the illustrated embodiment, the components within IC 205 are constructed using a power Bi-CMOS process, and the components outside IC 205 are separately manufactured components connected to IC 205 after IC 205 has been fabricated. It will be appreciated, however, that components shown outside of IC 205 may, in various embodiments, be packaged together in a single package if so desired. It will also be appreciated that one or more of the components illustrated as part of IC 205 may be separate components packaged either individually or together.

The operation of LED circuit 200 is analogous to the operation of Circuit 100 described previously in FIG. 1, with a few exceptions which will become apparent upon consideration of the following description. For example, three control/supply lines, LED3CNTRL_SPLY, LED2CNTRL_SPLY and LED1CNTRL_SPLY are illustrated instead of the battery-supply/data line combination illustrated in FIG. 1. The three supply/control lines are switched to battery voltage to turn on their corresponding LED arrays. When the control/supply lines are not connected to battery voltage they present a high impedance to IC 205. Also note that in the illustrated embodiment, IC 205 derives its own power by logically "OR"ing diodes 215, which are connected to the control/ supply lines. For example if any one of control supply lines LED1CNTRL_SPLY, LED2CNTRL_SPLY or LED3CNTRL_SPLY are switched to battery voltage, supply sense switcher control 240 is connected to battery power through enable lines 241. As a result, power on any one of the control supply lines will supply power for IC 205's operation.

Note also that in the illustrated embodiment control/supply lines are connected directly to a first current electrode of the corresponding switches HS1, HS2 and HS3. The other current electrode of the transistors forming switches HS1, HS2 and HS3, are connected to the LED array outputs 208, 210 and 212 respectively. Current Steering Control Lines (hereinafter referred to as "control lines") from supply sense switcher control 240 are connected to the gates of the transistors included in HS1, HS2 and HS3, such that supply sense switcher control 240 can control which switch provides current to its respective LED array.

For example, assume that LED3CNTRL_SPLY is connected to battery voltage while the remaining control supply lines are not. Power comes in CNTRL_3 206 and is connected to one side of the transistor that is part of HS3. Power is also coupled from CNTRL_3 206 to one of the diodes 215, and also to supply sense switcher control 240. Supply sense switcher control 240 senses that LED3CNTRL_SPLY line is active, notifies current switch controller 250, and provides a control signal to the gate of switch HS3. When the gate of switch HS3 is activated, the transistor turns on and current is allowed to flow from LED3CNTRL_SPLY through switch HS3, LED3, inductor L1, Rsense, and MLD0 to ground.

Differential amplifier 252 responds to the voltage drop across the resistor Rsense, and sends a signal to switch logic 254. Switch logic 254 sends a control signal to the gate of transistor MLD0 to activate or deactivate transistor MLD0 when the voltage difference across Rsense, which is related to the amount of current flowing through conductor L1, falls outside of a desired range. When transistor MLD0 is deactivated, instead of current flowing to ground, it is routed back to the high side switches HS1, HS2 and via recirculation diodes 262, 264 and 266. Note that when transistor MLD0 is turned off the voltage at inductor input 216 will begin to fly up, but will be clamped by the appropriate recirculation diodes 262, 264 and 266. The current in the inductor will then ramp down linearly until it reaches a lower trip point, at which time controller 250 will again activate MLD0. Note that in the illustrated embodiment three recirculation diodes are used, one for each LED channel. For significant mismatch in control/supply voltages, the recirculation diode tied to the lowest supply will conduct the majority of current during recirculation. However, the LEDs each still receive equal currents.

Controller 250 will continue to cycle transistor MLD0 on and off so as to keep the average current in inductor L1 at a desired level. The exact level of the desired average current is a function of how many control lines are high at a given time. For instance if we assume that each LED requires 500 mA of current then when all three control lines are on, the desired average current through inductor L1 will be 1.5 amps. When two control lines are on, then 1 amp of current will be needed to power two LED arrays. Similarly 500 mA will be needed for a single LED array. The average current in the inductor will be shared between LED array 1, 2 and 3 depending on the states of their respective control/supply lines.

The three control/supply lines LED3CNTRL_SPLY, LED2CNTRL_SPLY and LED1CNTRL_SPLY are diode "OR"ed to generate an internal supply rail. Once IC 205 is powered up the three control/supply lines are monitored to see which one or more was commanded on. Then, the corresponding switch HS1, HS2, or HS3 is turned on and controller 250 is enabled with the appropriate current programmed. Once the Controller 250 starts, a problem arises with sensing the control/supply lines. The control/supply line of a disabled LED array sits at high impedance. During the time when current is being recirculated, a high impedance control/supply line will be driven to the battery voltage through its corresponding recirculation diode. When MLD0 is turned on, however, the recirculation diode is reverse biased, and the disabled LED control line will get pulled to ground by internal pull down currents.

As a result, the decision to turn on or off in a particular LED array should be made when MLD0 is turned on. If, for instance, a control/supply line is disabled when MLD0 switches on, the control/supply line gets pulled to ground and controller will immediately turn off MLD0, and supply sense switcher control 240 will reprogram controller 250 for the lower desired average current. Note that in this case the current in the LED array that was commanded off will immediately go to zero and the current in the other LED arrays will spike up to their current limits. These current/voltage spikes will occur for the duration of time it takes for the control loop to turn off transistor MLD0 and begin recirculating current.

In the illustrated embodiment high side switches HS1, HS2 and HS3 are current limited to ensure acceptable current sharing between the three LED arrays LED1, LED2 and LED3 when various combinations of arrays are commanded on. The LED arrays may be commanded on, for example, by an automobile operator activating a turn signal, depressing a brake pedal, turning headlights on, etc. In other contexts LED arrays may be commanded on using various suitable control and/or switching methods commonly known. Ideally each control line would be at the exact same voltage, each of the LEDs would have the exact same voltage drop when commanded on, and the total inductor current would be shared perfectly between the three LED arrays.

However the high side switches are limited to ensure that unequal current sharing doesn't exceed a certain level. So if, for example, each LED array required 500 mA and all three were commanded on, then controller 250 would set the average inductor current to 1.5 amps. Each high side switch should have its current limit set to something slightly greater than 500 mA, for example 600 mA. Then if one LED array has a slightly lower voltage drop or slightly higher control line voltage, instead of taking the entire 1.5 amps while starving the other two LEDs, the LED array would be clamped to 600 mA leaving 900 mA to be shared between the other two LED arrays.

In the case where the supply/control lines are all at the same level and the LEDs all have very close voltage drops, all three high side switches would be fully on and the power dissipation would be very low. Once one of the high side switches goes into current limit mode, its drain source voltage and power dissipation will increase. The assumption is that the power dissipation will only increase as much as the mismatch between LEDs and/or the mismatch between control voltage. This is an advantage over the prior art, which applies excessive voltage across the LED arrays to ensure they are fully on and uses current limit resistors, which always dissipate high power.

In an alternate embodiment this current sharing scheme could have two different current limit levels, with one level being slightly greater than the desired average current and one level at exactly the desired average current. When the 600 mA current limit activates for a predefined time, the circuit could automatically shift down to 500 mA. Then the other LED array could settle in at the desired 500 mA as well, although now all the ripple will appear across this LED.

When one LED is commanded off, supply sense switcher control 240 readjusts the current regulation to a lower level by first turning off MLD0 and allowing the current to decay to its new lower trip point. In at least one embodiment, the high side switch for the newly disabled channel remains on until the inductor current has decayed to its new value. If the high side switch is turned off immediately after sensing a control/supply line has gone low, then the other LED arrays will experience a large current spike as the total inductor current will now be shared among fewer LED arrays.

The ports of IC 205 are spared negative transients except for the case when the last of the LED arrays is turned off. At turn off, a large negative transient will occur at the high side of the inductor. For the last LED array to turn off with its high side switch on, the voltage at the source of the high side switch will be clamped to ground while the inductor finishes discharging. The other LED arrays have their high side switches off, leaving the potential for their source voltage to dip a few volts below ground.

Figure 3:
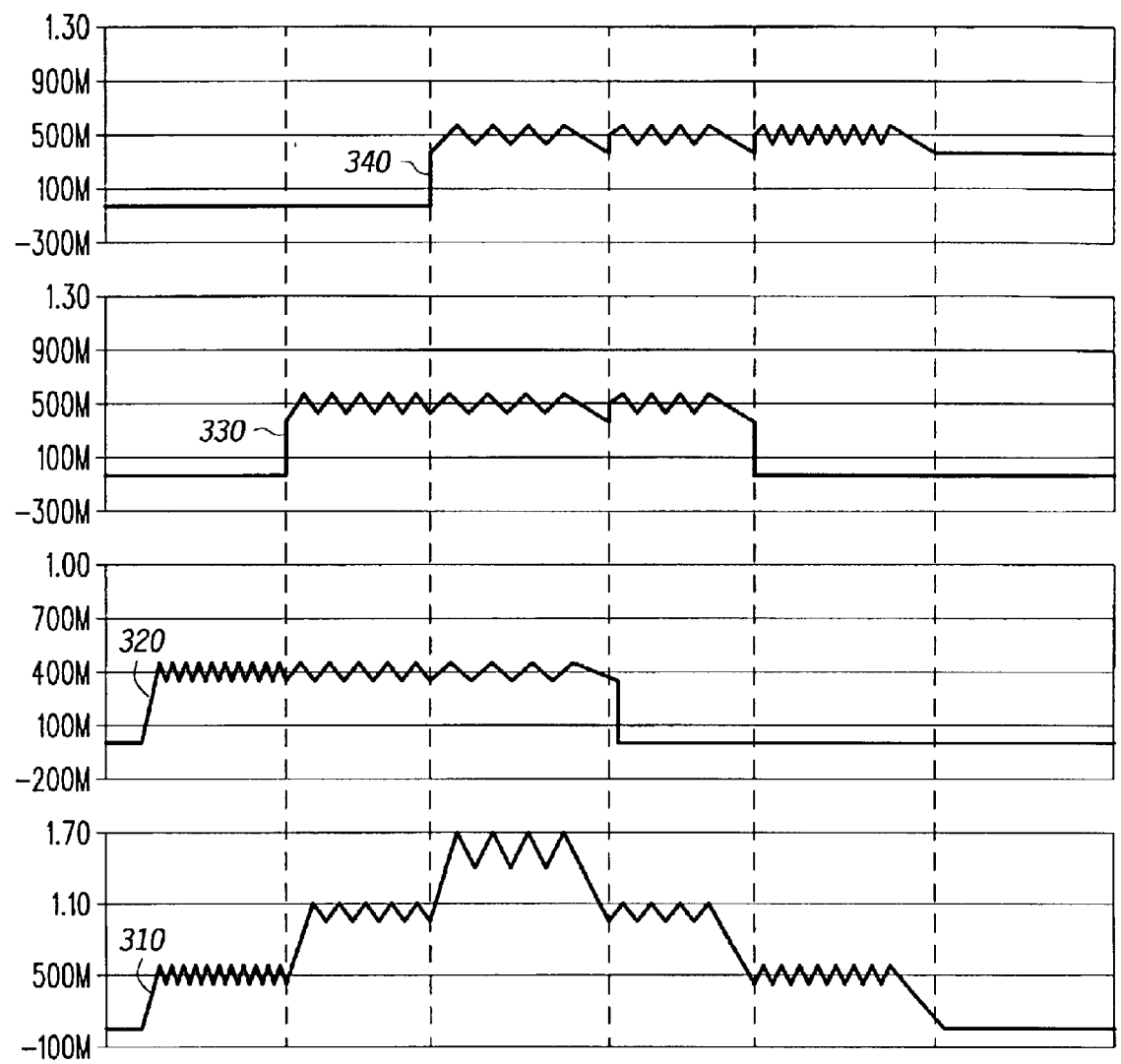
FIG. 3 is a series of graphs illustrating current flow through matched LEDs and an inductor, according to an embodiment of the present disclosure.

Referring next to FIG. 3 a series of graphs illustrating the flow of current through LED LED2, LED 3 and inductor L1 of FIG. 2 will be discussed according to an embodiment of the present disclosure. The curves illustrated in FIG. 3 show the currents through the individual devices when LED1, LED2 and LED3 are commanded on in that order, and then off again in the same order. Curve 310 illustrates the combined current flowing through the inductor L1; curve 320 illustrates the current flowing through LED1; curve 330 illustrates the current flowing through LED2; and curve 340 illustrates the current flowing through LED3.

The combined current flowing through inductor L1 shown by curve 310, starts at 500 mA when only a single LED is on, jumps to approximately 1A when two LEDs are on, and rises to 1.5 A when all three LED arrays are on. The ripple seen in curve 310 is a result of turning MLD0 on and off to maintain the average current through the inductor at the desired level.

In FIG. 3 the ripple produced is within +/−10% of the desired average current. Note that the ripple in curves 310, 320, 330 and 340 changes in frequency as LEDs are turned on or off, but generally remains constant in amplitude. The large amplitude of the lower peaks that occur when another LED array is turned off occur because once an LED array is commanded off, the recirculation current is allowed to decay to the new lower level before the corresponding high side switch is actually turned off.

Figure 4:
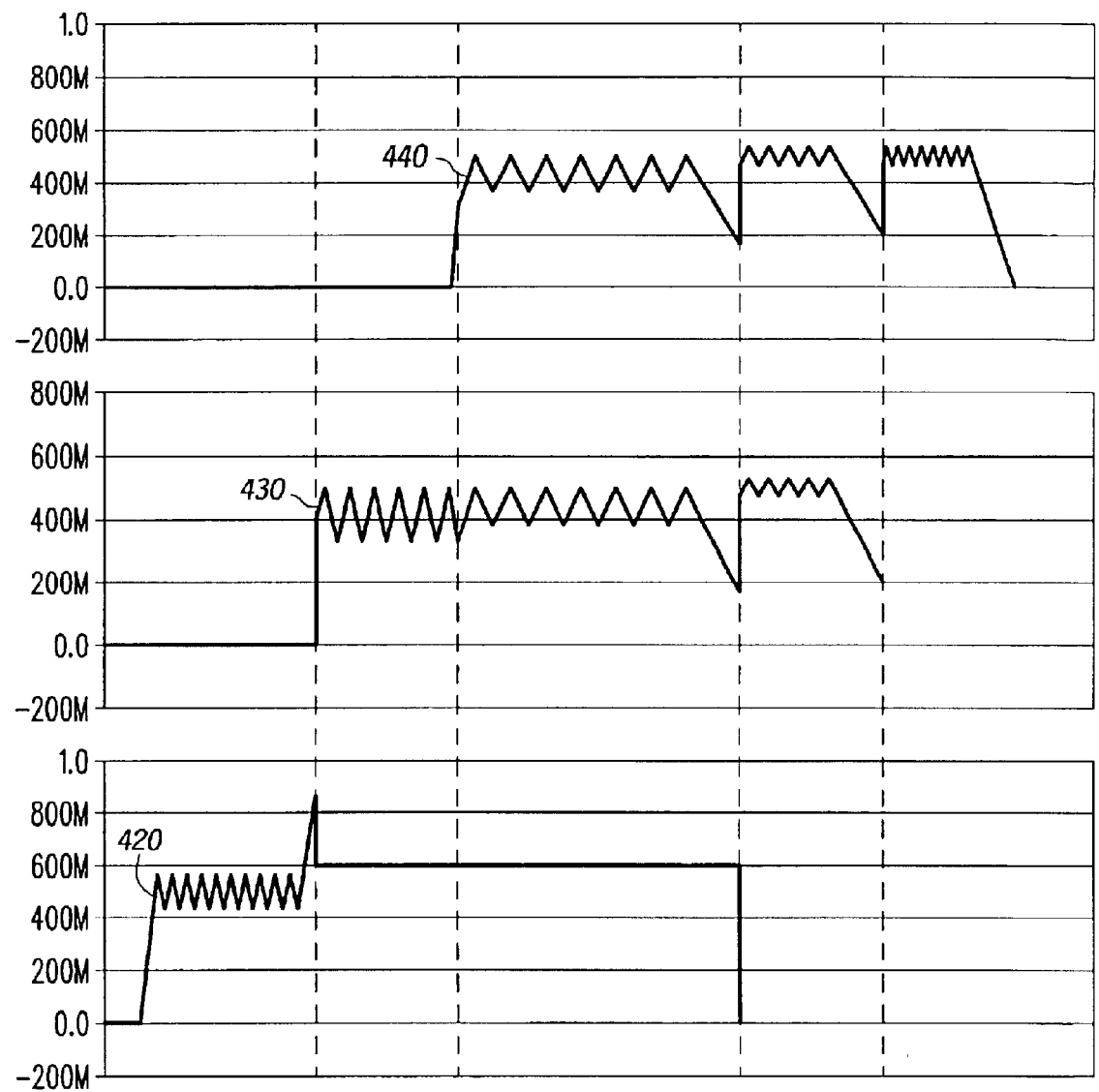
FIG. 4 is a series of graphs illustrating the current flow through various LED arrays when the LED arrays are not exactly matched, according to an embodiment of the present disclosure.

Referring next to FIG. 4 with reference to FIG. 2, the effect of current limiting the high side switches is illustrated according to an embodiment of the present invention. Curve 420 illustrates the current flowing through LED1; curve 430 illustrates the current flowing through LED2; and curve 440 illustrates the curve flowing through LED3. First, LED1 is commanded on as illustrated by curve 420. In the illustrated example, LED1 has a lower voltage drop than either LED2 or LED3, so when LED2 is turned on, LED1 attempts to draw excess current as shown by the slight spike at approximately 50 microseconds. However, the current limiting takes effect and clamps the maximum current allowed to pass through the high side switch associated with LED1 at 600 mA. Since LED2 and LED3 draw approximately the same amounts of current no current limiting occurs with their high side switches, but the high side switch for LED1 remains in a current limiting state until it is turned off at approximately 180 microseconds.

Figure 5:
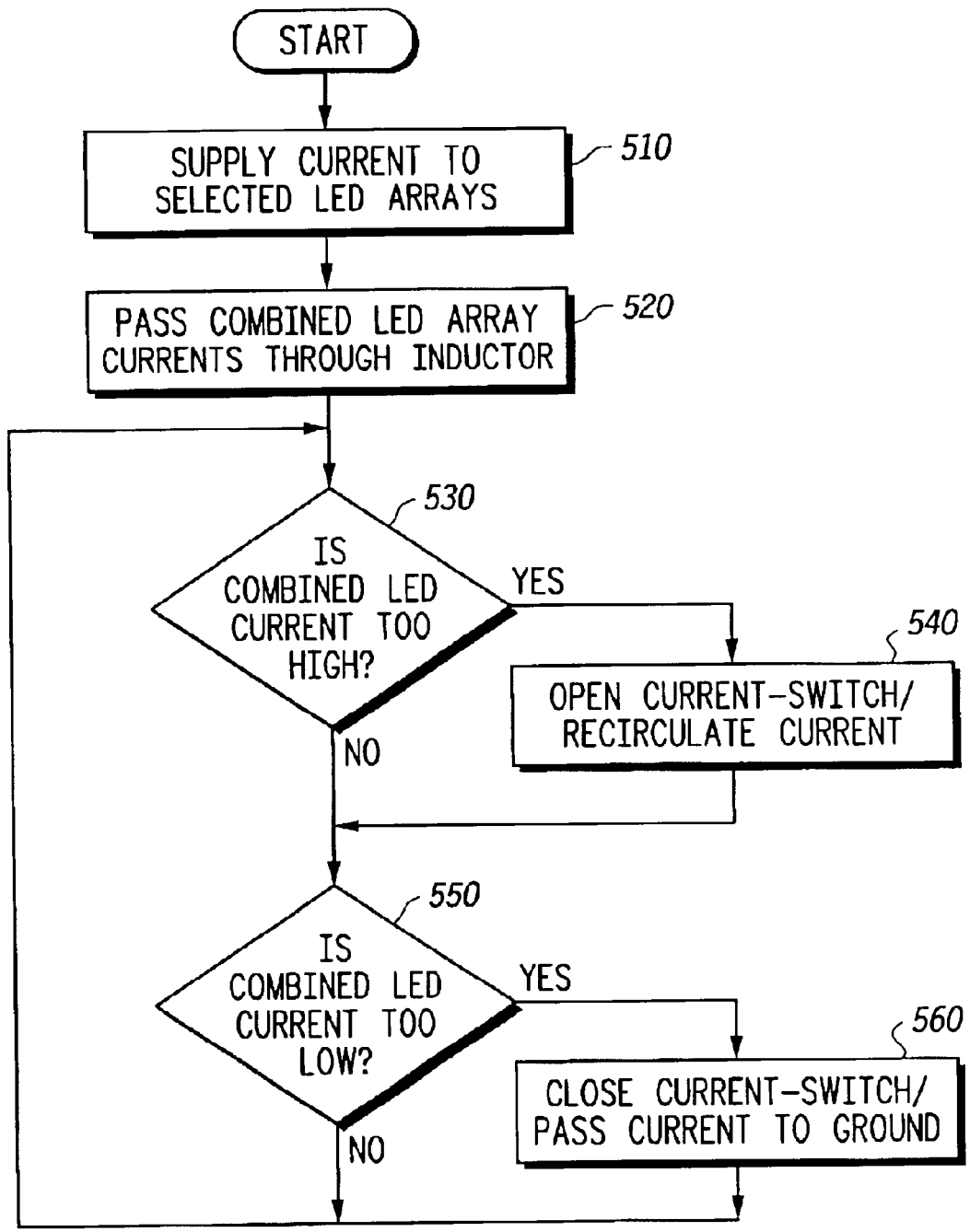
FIG. 5 is a flow chart illustrating a method of controlling current through LEDs according to an embodiment of the present disclosure.

Referring next to FIG. 5 a flow chart illustrating a method according to the present disclosure will be discussed. The method illustrated in the flow chart of FIG. 5 shows how constant current switching can be used to provide closed loop current control for high intensity LED's or other current sensitive loads. In step 510 current is supplied to selected LED arrays through high side switches, which are current limited to facilitate equal sharing of current among all activated LED arrays.

The current flowing through all selected LED arrays is combined and passed through an inductor in step 520. The inductor causes the current to ramp linearly up during initial power up of the LED arrays, and also provides a linear ramp downward when current is recirculating from the inductor back to the LED arrays. In step 530 the combined current passing through the inductor is measured, and a decision is made as to whether or not the combined current is above a desired set point. If it is determined in step 530 that the combined current is too high, then step 540 is performed. In step 540, the current switch is opened to permit current to recirculate through recirculation diodes, back through the high side switches and on to the LED arrays rather then having the current pass through the current switch to ground. If it is determined in step 530 that the combined current is not higher than a predetermined maximum, then the amount of current is compared to a predetermined minimum in step 550. If the amount of current is less then the predetermined minimum, then a controller closes the current switch in step 560, and allows the current from the inductor to pass to ground. This process is repeated with the current switch being opened whenever the combined current is too high and the switch being closed again whenever the combined current is too low. In this way tight control is maintained over the amount of current flowing through high intensity LEDs being controlled by the circuit while still permitting relatively efficient circuit operation.

In the preceding detailed description of the figures, reference has been made to the accompanying drawings, which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical, chemical, and electrical changes may be made without departing from the spirit or scope of the disclosure. For example while the above discussion focuses primarily on the use of two or three light emitting diode arrays, the principal set forth herein may be applied to any number of arrays desired. In addition, while the term LED array has been used it should be appreciated that array may include as few as one LED or as many LED's as practicable. In addition at least one embodiment illustrated above refers to power Bi-CMOS transistors. However, it will be appreciated that other transistor/switch types may be used in implementing the teachings set forth herein.

Furthermore, many other varied embodiments that incorporate the disclosure may be easily constructed by those in the art. For example the embodiments discussed above employ diodes to control the recirculation currents and route the recirculation current to the appropriate switches. However, in other embodiments synchronized switches may be used in place of diodes. Additionally, while the above discussion focuses primarily on embodiments in which current flow to different LED arrays is equal, other embodiments may be employed in which the current supplied to different LED arrays is intentionally made unequal to facilitate brightness control.

To avoid detail not necessary to enable those skilled in the art to practice the invention, the description may omit certain information known to those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is to be defined only by the appended claims.

What is claimed is:

1. A circuit comprising:
    a first current limiting switch comprising a first current limiting switch enable node and a first current limiting switch output node, the first current limiting switch to limit an amount of current provided at the first current limiting switch output node to a fist predefined amount;
    a first output port coupled to the first current limiting switch output node;
    a second current limiting switch comprising a second current limiting switch enable node and a second current limiting switch output node, the second current limiting switch to limit an amount of current provided at the second current limiting switch output node to a second predefined amount;
    a second output port coupled to the second current limiting switch output node;
    a first input port;
    a sensor including:
        an input coupled to the first input port;
        an output to provide an indication of an amount of current received at the input;
    a current limiter including:
        current input coupled to said output of said sensor,
        a control input to receive a control;
        a first current output node to provide current received at the current input when a signal at the control input is asserted;
        a second current output node to provide current received at the current input when the signal at the control input is deasserted; and
        a diode coupled in series with said current limiter, said diode to provide reverse bias protection.

2. The circuit as in claim 1, wherein said current limiter further includes:
    a controller coupled to said control input, said controller including;
        an input coupled to said sensor, said input to receive the indication provided by said sensor; and
        logic having an input coupled to said input of the controller, and an output coupled to the control input of the current limiter, said logic to assert and deassert the signal based on the indication;
    a transistor including:
        a first current electrode coupled to said first current output node of the current limiter;
        a second current electrode coupled to said second current output node of the current limiter; and
        a control node coupled to said output of said logic.

3. The circuit as in claim 1, wherein the signal is asserted when the amount of current received at the input is more than about +/−20% different from a specified operating current of one or more devices coupled to the first current limiting switch output node and the second current limiting switch output node.

4. The circuit as in claim 1, wherein the signal is asserted when the amount of current received at the input is more than about +/−10% different from a specified operating current of one or more devices coupled to the first current limiting switch output node and the second current limiting switch output node.

5. The circuit as in claim 1, wherein the signal is asserted when the amount of current received at the input is more than about +/−5% different from a specified operating current of one or more devices coupled to the first current limiting switch output node and the second current limiting switch output node.

6. The circuit as in claim 1, further including:
    a first supply input;
    a second supply input;
    a switch-controller including:
        a first input coupled to said first supply input;
        a second input coupled to said second supply input;
        logic coupled to said first input and said second input to assert a control signal based on which of said first supply input and said second supply input has a voltage present thereon;
        a fist output coupled to said logic and to said enable node of said first current limiting switch; and
        a second output coupled to said logic and to said enable node of said second current limiting switch.

7. The circuit as in claim 6, further including:
    a first diode coupled between said first supply input and said first current output node; and
    a second diode coupled between said second supply input and said first current output node.

8. The circuit as in claim 1, further including:
    a first light emitting diode (LED) array coupled to said first output port;
    a second LED array coupled to said second output port, wherein said first LED army and said second LED array are electrically parallel; and
    an inductor coupled in series between said first and second LED arrays and said first input port.

9. The circuit as in claim 1, wherein said circuit is an automotive tail-light controller.

10. The circuit as in claim 1, wherein a current limit of said current-limiting switches is adjustable.

11. A circuit comprising:
    a plurality of first contacts to be coupled to a plurality of light emitting diodes (LEDs);
    a plurality of switches to selectively provide current to particular contacts of said plurality of contacts;

a switch controller to selectively activate one or more switches of said plurality of switches, to supply current to particular LEDs;

a second contact to be coupled to an inductor coupled in series with the plurality of a current-switch coupled in series between said second contact and a voltage reference node; and a current-switch controller to change a state of said current-switch based on whether an amount of current flowing through said second contact is within a desired range.

12. The circuit as in claim 11, wherein said current-switch controller includes:

a current sensor to determine the amount of current flowing through said second contact; and logic to determine when the amount of current is within the desired range.

13. The circuit as in claim 12, wherein said current sensor includes:

a sense resistor coupled in series with said second contact; and a differential amplifier coupled across said sense resistor.

14. The circuit as in claim 11, wherein said desired range is within about +/−20% of a combined maximum current rating of said particular LEDs to which current is being supplied.

15. The circuit as in claim 11, wherein said desired range is within about +/−10% of a combined maximum current rating of said particular LEDs to which current is being supplied.

16. The circuit as in claim 11, wherein said desired range is within about +/−5% of a combined maximum current rating of said particular LEDs to which current is being supplied.

17. The circuit as in claim 11, wherein said current-switch controller is programmable.

18. The circuit as in claim 11, further including a plurality of power-supply inputs, and wherein:

said switch controller includes logic to sense which of said plurality of power-supply inputs has a voltage present thereon.

19. The circuit as in claim 18, wherein said switch controller further includes logic to activate particular switches in response to a voltage being present on particular power-supply inputs.

20. The circuit as in claim 11, further including a diode coupled between each of said plurality of contacts and said current switch, said diodes to limit the voltage at said second contact.

21. The circuit as in claim 11, further including:

a plurality of LED arrays coupled to said plurality of contacts; and an inductor coupled in series between said plurality of LED arrays and said second contact.

22. The circuit as in claim 11, further including a diode coupled in series with said current switch, said diode to provide reverse-bias protection.

23. The circuit as in claim 11, further including a plurality of diodes coupled to said plurality of contacts, said plurality of diodes to recirculate current from said inductor to said plurality of switches.

24. The circuit as in claim 11, wherein said circuit is an automotive tail-light controller.

25. The circuit as in claim 11, wherein said plurality of switches are current-limiting switches.

26. The circuit as in claim 25, wherein a current limit of said current-limiting switches is adjustable.

27. A circuit comprising:

a first port to be coupled to a first side of a voltage supply;

a second port to be coupled to a second side of the voltage supply;

a third port to be coupled to a light emitting diode (LED) array;

a fourth port to be coupled to an inductor;

a first transistor including:
  a first current electrode;
  a second current electrode coupled to said second port;
  a control node;

a resistor having a first end coupled to said fourth port and a second end coupled to said first current electrode of said first transistor;

a second transistor including:
  a first current electrode coupled to said third port;
  a second current electrode coupled to said first port; and
  a control node;

a recirculator coupled in series between said first port and said second end of said resistor;

a first controller including:
  a differential amplifier coupled across said resistor to determine a voltage drop across said resistor;
  logic to generate a control signal based on said voltage drop;
  an output coupled to said logic and to said control node of said first transistor;
  an input coupled to said logic;

a second controller including:
  an input coupled to said first port;
  logic coupled to said input to determine when a voltage is present at said first port;
  a first output coupled to said logic and to said control node of said second transistor; and
  a second output port coupled to said logic and to said input port of said first controller.

28. The circuit as in claim 27, wherein said logic of said first controller is to generate a control signal when the voltage drop across said resistor indicates that current flowing through said third port is outside of a range of about +/−20% of a maximum current rating of said LED array.

29. The circuit as in claim 27, where said logic of said first controller is to generate a control signal when the voltage drop across said resistor indicates that current flowing through said third port is outside of a range of about +/−10% of a maximum current rating of said LED array.

30. The circuit as in claim 27, wherein said logic of said first controller is to generate a control signal when the voltage drop across said resistor indicates that current flowing through said third port is outside of a range of about +/−5% of a maximum current rating of said LED array.

31. The circuit as in claim 27, wherein said logic of said first controller is programmable.

32. The circuit as in claim 27, wherein said recirculator includes a diode.

33. The circuit as in claim 27, wherein said recirculator includes a synchronous switch.

34. The circuit as in claim 27, further including:

a plurality of first ports to be coupled to a firs side of a plurality of voltage supplies;

a diode coupled in series between each of said plurality of first ports and said second end of said resistor;

a plurality of third ports to be coupled to a plurality of LED arrays;

a plurality of second transistors to selectively provide current to particular ones of said LED arrays; and wherein said second logic is to selectively activate particular second transistors of said plurality of second transistors when a voltage is present at particular first ports.

35. The circuit as in claim 27, further including:
an LED array coupled to said third port; and
an inductor coupled in series between said LED array and said fourth port.

36. The circuit as in claim 27, further including a diode coupled in series with said fist transistor and said resistor.

37. The circuit as in claim 27, further including:
a fifth port to be coupled to a blocking capacitor; and
a diode coupled in series between said first port and said fifth port to provide an internal voltage rail.

38. The circuit as in claim 27, wherein said circuit is an automotive tail-light controller.

39. The circuit as in claim 27, further including a current limiter coupled from said first current electrode of said second transistor to said second current electrode of said second transistor.

40. The circuit as in claim 39, wherein a current limit of said second transistor is adjustable.

41. A method comprising:
supplying current to selected LED arrays of a plurality of LED arrays;
combining the current supplied to the selected LED arrays into a combined current;
passing the combined current through an inductor;
determining an amount of current passing through the inductor;
de-activating a current-switch when the amount of current passing through the inductor is determined to be greater than an upper limit;
routing the inductor current to the selected LED arrays when the current-switch is deactivated;
activating the current-switch when the amount of current passing through the inductor is determined to be less than a lower limit; and
passing the inductor current to ground when the current-switch is activated.

42. The method as in claim 41, wherein supplying current to selected LED arrays includes activating selected switches associated with the selected LED arrays.

43. The method as in claim 42, further including limiting an amount of current flowing through the activated switches.

44. The method as in claim 43, wherein supplying current further includes:
sensing a supply voltage on selected supply lines of a plurality of supply lines; and
activating selected switches based on which of the plurality of supply lines has a voltage sensed thereon.

45. The method as in claim 41, wherein determining the amount of current passing through the inductor includes measuring a voltage drop across a sense resistor coupled in series with the inductor.

46. The method as in claim 41, wherein the upper limit is up to about 20% greater than a combined maximum current rating of the selected LED arrays to which current is being supplied.

47. The method as in claim 41, wherein the upper limit is up to about 10% greater than a combined maximum current rating of the selected LED arrays to which current is being supplied.

48. The method as in claim 41, wherein the upper limit is up to about 5% greater than a combined maximum cub rating of the selected LED arrays to which current is being supplied.

49. The method as in claim 41, wherein the lower limit is up to about 20% less than a combined maximum current rating of the selected LED arrays to which current is being supplied.

50. The method as in claim 41, wherein the lower limit is up to about 10% less than a combined maximum current rating of the selected LED arrays to which current is being supplied.

51. The method as in claim 41, wherein the lower limit is up to about 5% less than a combined maximum current rating of the selected LED arrays to which current is being supplied.

52. The method as in claim 41, wherein the current-switch controller is programmable.

53. The method as in claim 41, wherein routing the inductor current includes passing the inductor current through a plurality of diodes.

\* \* \* \* \*

UNITED STATES PATENT AND TRADEMARK OFFICE
CERTIFICATE OF CORRECTION

PATENT NO. : 6,798,152 B2
DATED : September 28, 2004
INVENTOR(S) : Alan Michael Rooke and Ibrahim S. Kandah It is certified that error appears in the above-identified patent and that said Letters Patent is hereby corrected as shown below:

Column 13,
Line 5, add the word -- LEDs; -- after the sentence "with the plurality of" and then start new element on line 6 with "a current-switch coupled in series between said second contact and a voltage reference node; and".

Column 16,
Line 3, change "claim 43" to -- claim 41. --

Signed and Sealed this

Fifteenth Day of March, 2005

JON W. DUDAS
*Director of the United States Patent and Trademark Office*